US009313086B2

(12) United States Patent
Tetzlaff et al.

(10) Patent No.: US 9,313,086 B2
(45) Date of Patent: Apr. 12, 2016

(54) CREATING PACKET FLOWS TO REDUCE REDUNDANCY

(71) Applicants: Thomas A. Tetzlaff, Hillsboro, OR (US); Minyoung Park, Portland, OR (US); Emily Qi, Portland, OR (US)

(72) Inventors: Thomas A. Tetzlaff, Hillsboro, OR (US); Minyoung Park, Portland, OR (US); Emily Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 13/728,822

(22) Filed: Dec. 27, 2012

(65) Prior Publication Data

US 2014/0185449 A1    Jul. 3, 2014

Related U.S. Application Data

(60) Provisional application No. 61/600,030, filed on Feb. 17, 2012.

(51) Int. Cl.
*H04L 12/24* (2006.01)
*H04W 74/00* (2009.01)
*H04W 72/00* (2009.01)
*H04W 80/02* (2009.01)
*H04W 84/12* (2009.01)

(52) U.S. Cl.
CPC ............ *H04L 41/00* (2013.01); *H04W 72/005* (2013.01); *H04W 74/002* (2013.01); *H04W 80/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,724,348 A * | 3/1998 | Basso et al. | 370/384 |
| 2004/0242235 A1 | 12/2004 | Witana | |
| 2005/0245269 A1 | 11/2005 | Demirhan et al. | |
| 2007/0106809 A1 * | 5/2007 | Cha et al. | 709/230 |
| 2008/0181161 A1 | 7/2008 | Gi Kim et al. | |
| 2009/0080355 A1 * | 3/2009 | Song | 370/312 |
| 2009/0319845 A1 * | 12/2009 | Liu et al. | 714/747 |
| 2009/0323659 A1 | 12/2009 | Zhang | |
| 2010/0271959 A1 | 10/2010 | Qi et al. | |
| 2012/0084388 A1 * | 4/2012 | De Foy et al. | 709/217 |
| 2012/0322459 A1 * | 12/2012 | Jaffri et al. | 455/456.1 |
| 2013/0157699 A1 * | 6/2013 | Talwar et al. | 455/466 |
| 2014/0026174 A1 * | 1/2014 | Baykal | 725/111 |

FOREIGN PATENT DOCUMENTS

WO    2013/122810 A1    8/2013

OTHER PUBLICATIONS

International Preliminary Report on Patentability and Written Opinion received for PCT Patent Application No. PCT/US2013/025140, mailed on Aug. 28, 2014, 7 Pages.
International Search Report and Written Opinion received for PCT Patent Application No. PCT/US2013/025140, mailed on May 16, 2013, 10 Pages.

* cited by examiner

*Primary Examiner* — Jae Y Lee
*Assistant Examiner* — Tito Pham
(74) *Attorney, Agent, or Firm* — Ellis B. Ramirez; Prass LLP

(57) ABSTRACT

A System and method for creation and transport of flows. The method includes transmitting an ADDFLOW request to a receiver to add the flow to the wireless network. The method also includes receiving a response message indicating that the flow will be added to the wireless network and delivering the flow to the wireless network. A given flow may be uniquely identified by the concatenation of a flow ID and a flow address. The flow address will always be either the transmitter's or receiver's MAC address. This method could be extended to compress any bit sequences that take on only a limited set of values.

21 Claims, 5 Drawing Sheets

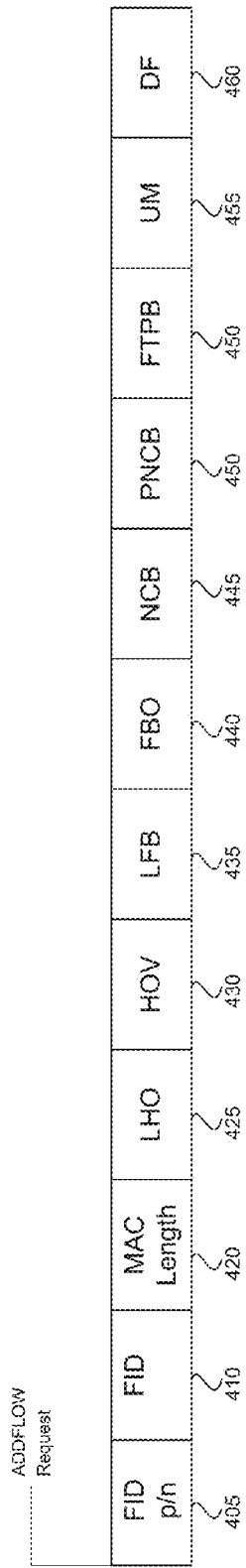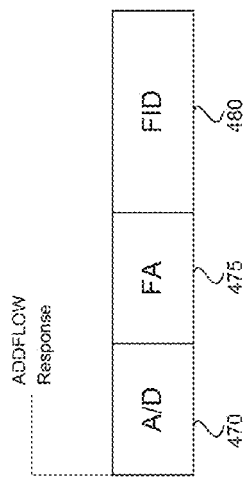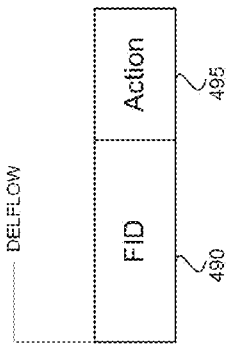
FIG. 4A
FIG. 4B
FIG. 4c

CREATING PACKET FLOWS TO REDUCE REDUNDANCY

CROSS-REFERENCES TO RELATED APPLICATIONS

This application claims priority to U.S. Provisional Application No. 61/600,030 entitled "ADDING FLOW TECHNIQUES," filed Feb. 17, 2012, the entire disclosure of which is incorporated herein by reference in its entirety.

TECHNICAL FIELD

The present invention relates generally to transporting traffic in a data network, and more particularly to a system for creation and transport of traffic flows across data networks.

BACKGROUND

Wireless networks often exchange information in the form of frames that include multiple symbols (e.g., bits). For example, a standard for such a network is being developed by the Institute of Electrical and Electronics Engineers (IEEE) 802.11ah task group. More particularly, the IEEE 802.11ah standard will attempt to provide an efficient protocol, that can enable, for example, small battery powered wireless devices (e.g. sensors) to use Wi-Fi (802.11) to connect to the Internet with very low power consumption. IEEE 802.11ah is being developed to support a transmission range of 1 km for the sensor/metering use case. The number of associated stations for this type of application is expected to be much larger than 2007 stations, which is the current maximum limit for the AID (association ID). Such wireless networks often employ sets of frames that have common bit sequences. A set of such frames is referred to herein as a "flow". Thus, such flows may exhibit duplicated information. As a result, the size of frames in such flows may be larger than desired.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is an illustration of the contents of the ADDFLOW request in accordance to an embodiment;

FIG. 4B is an illustration of the contents of the ADDFLOW response in accordance to an embodiment;

FIG. 4C is an illustration of the contents of the DELFLOW frame in accordance to an embodiment.

Figure 1:
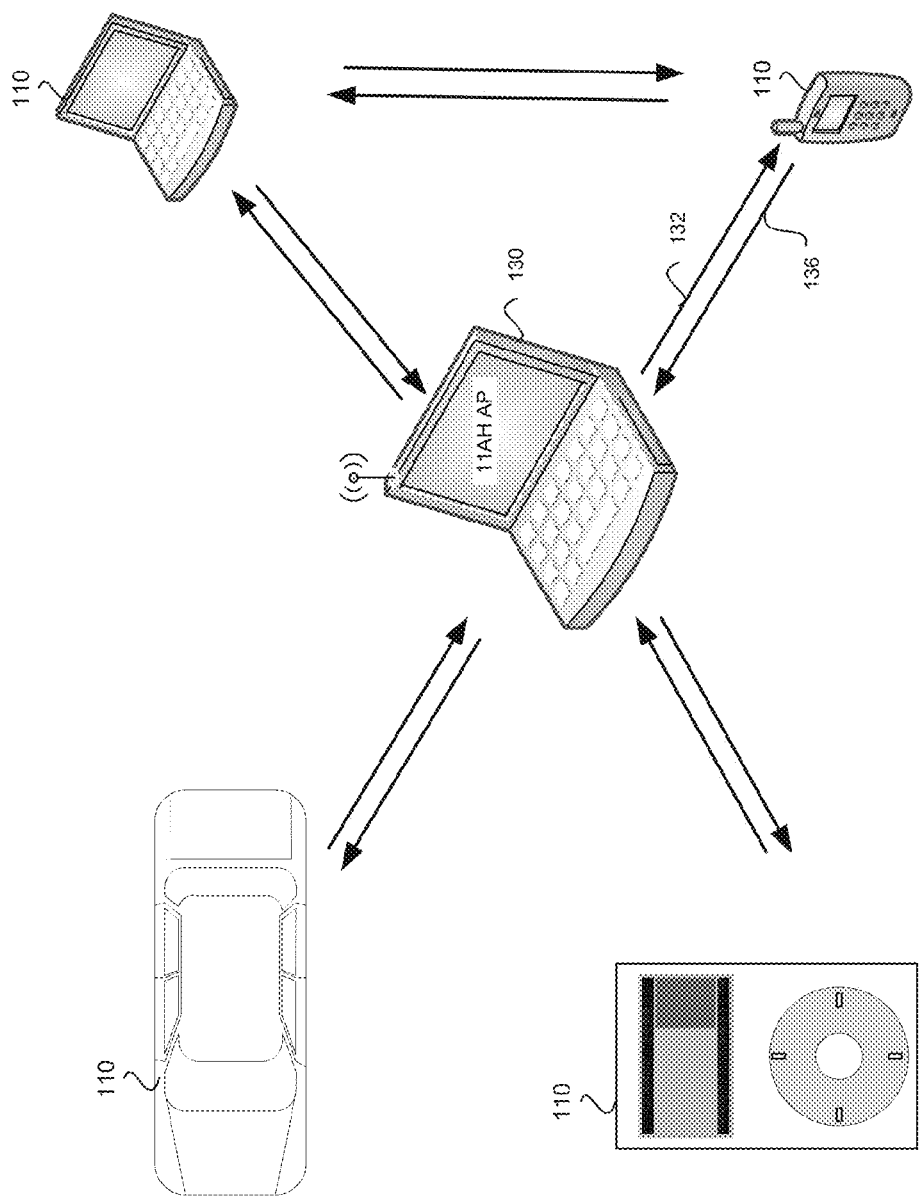
FIG. 1 illustrates a wireless network in accordance to an embodiment.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

In this document, a "flow" will refer to any set of frames that have common bit sequences. In IEEE 802.11ah, there is a desire to reduce the size of frames by removing information duplicated in every instance of frequently transmitted flows. The idea is that by identifying the redundant information once initially, all subsequent transmissions of frames in this flow can be compressed.

A "processor" is an example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions.

The term "wireless device" as used herein includes, for example, portable or non-portable devices capable of wireless communication or the like. A plurality of wireless devices forms a wireless communication system or wireless network.

The problem being addressed is exactly how to specify these flows in a general manner. The disclosed embodiment is for a new flow frame type/subtype is handled separately; this solution is limited to a method of creating the flow.

The method of adding a flow will be directly analogous to the method used for adding block acknowledgements. Management action frames are used for requesting the addition of a flow, responding to that request, and for deleting a flow. This method will not have any restrictions on the type of frame composed in the flow. (In fact, one could choose a single flow that encompasses all frames. Of course, there would be no redundancy so the flow frame would end up being larger—having the overhead of identifying a flow in addition to the complete frame contents—but it could be done.)

FIG. 1 shows one embodiment of a communication network 100 that comprises one embodiment of a transport system that operates to create and transport content flows across data networks. For example, the transport system is suitable for use in transporting content clips from a content provider network to a wireless access network for broadcast distribution.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), or other schemes. Implementations of the 802.11ah protocol may be used for sensors, metering, and smart grid networks. Aspects of certain devices implementing the 802.11ah protocol may be used to transmit wireless signals across a relatively long range, for example about one kilometer or longer.

FIG. 1 illustrates an example of a wireless communication system 100 in which aspects of the present disclosure may be employed. The wireless communication system 100 may operate pursuant to a wireless standard, for example the 802.11ah (11AH) standard. The wireless communication system 100 may include an access point (AP) 130 or access node, which communicates with STAs 110 or nodes. AP nodes serve as the gateway between some or all of the nodes and the rest of the world, e.g., via the Internet. An 11ah compliant AP is capable of exchanging information with indoor and outdoor sensors and cellular offloading devices.

A variety of processes and methods may be used for transmissions in the wireless communication system 100 between the AP 130 and the STAs 110. For example, signals may be sent and received between the AP 130 and the STAs 110 in accordance with OFDM/OFDMA techniques. If this is the case, the wireless communication system 100 may be referred to as an OFDM/OFDMA system. Alternatively, signals may be sent and received between the AP 130 and the STAs 110 in accordance with CDMA techniques. If this is the case, the wireless communication system 100 may be referred to as a CDMA system.

A communication link that facilitates transmission from the AP 130 to one or more of the STAs 110 may be referred to as a downlink (DL) 132, and a communication link that facilitates transmission from one or more of the STAs 110 to the AP 130 may be referred to as an uplink (UL) 136. Alternatively, a downlink 132 may be referred to as a forward link or a forward channel, and an uplink 136 may be referred to as a reverse link or a reverse channel.

Through the use of the frame-format scheme, the stations 110 may discover each other and exchange station-capability information, which may allow for P2P communications there between. For example, wireless docking and sync & go techniques for a laptop computer may be achieved. Furthermore, a laptop computer will be able to determine that a wireless display device is indeed a display and not a wireless hard drive, for example, which will allow for wireless use of the display by the laptop computer. A cell phone may be able to discover and determine the capabilities of an MP3 player so that it can synchronize music files with the MP3 player.

The AP 130 may act as a base station and provide wireless communication coverage in a basic service area (BSA). The AP 130 along with the STAs 110 associated with the AP 130 and that use the AP 130 for communication may be referred to as a basic service set (BSS). It should be noted that the wireless communication system 100 may not have a central AP 130, but rather may function as a peer-to-peer network between the STAs 110. Accordingly, the functions of the AP 130 described herein may alternatively be performed by one or more of the STAs 110.

Figure 2:
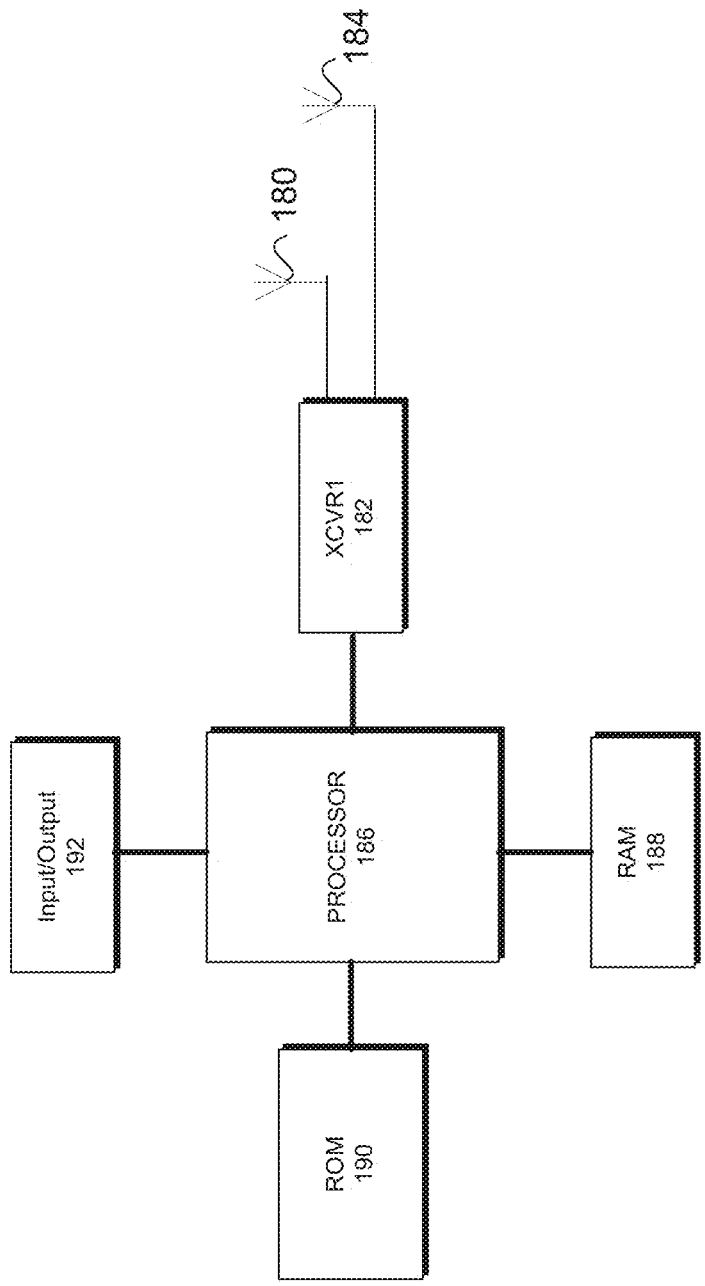
FIG. 2 is an exemplary communication device suitable for implementing different embodiments of the disclosure.

FIG. 2 is an exemplary communication device 200 suitable for implementing different embodiments of the disclosure. The communication device 200 includes a processor 186 that is coupled to one or more memory devices, such as a read only memory (ROM) 190, a random access memory (RAM) 188, a transceiver 182 that is coupled to a first antenna 180 and to a second antenna 184, and an input/output (I/O) device 192. The processor 186 may be implemented as one or more processor chips.

Processor 186 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 186 may, for example, process data received by STA 110 or AP 130, and/or process data intended for transmission.

The ROM 190 is used to store instructions and perhaps data which are read during program execution. ROM 190 is a non-volatile memory device. The RAM 188 is used to store volatile data and perhaps to store instructions. The ROM 190 may include flash memories or electrically erasable programmable memory to support updating the stored instructions remotely, for example through an over-the-air interface via the transceiver 182 and the antennas 180 and/or 184.

The antennas 180, 184 and transceiver 182 support radio communications such as the communication link shown in FIG. 1. Transceivers (182) are able to perform separate or integrated functions of receiving and/or transmitting/receiving wireless communication signals, flows, blocks, frames, transmission streams, packets, messages and/or data.

The I/O device 192 may be a keypad and a visual display to permit entering numbers and selecting functions. Alternatively, the I/O device 192 maybe a keyboard and a touch pad, such as a keyboard and a touch pad of a laptop computer. The processor 186 executes instructions, codes, computer-executable instructions, computer programs, scripts which it accesses from ROM 190 or RAM 188.

Figure 3:
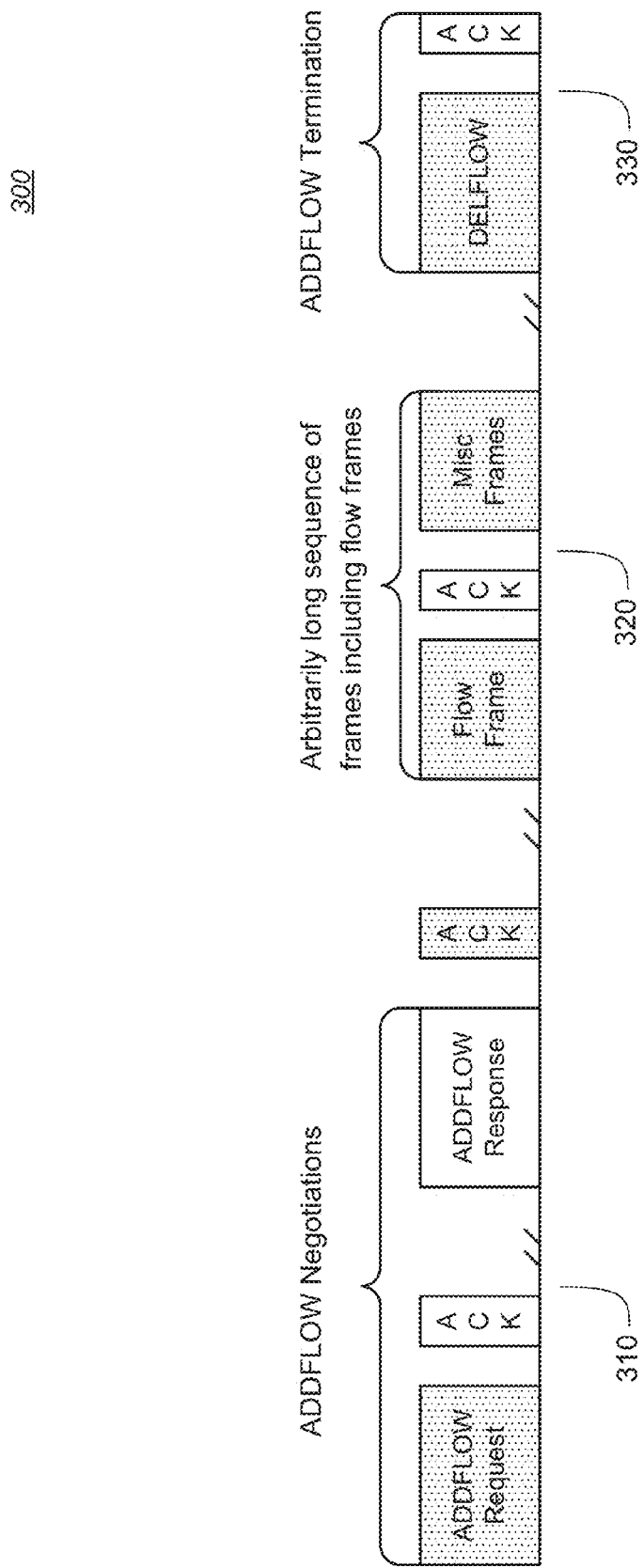
FIG. 3 is an Illustration of Frame Sequence for Adding a Flow in accordance to an embodiment.

FIG. 3 is an Illustration of Frame Sequence for Adding a Flow 300 in accordance with an embodiment. Frame Sequence for Adding a Flow 300 starts with ADDFLOW negotiations 310, continues with communicating with arbitrarily long sequence of frames including flow frames 320, and termination 330 of an agreed upon ADDFLOW after completion of the flows. The ADDFLOW negotiations comprise an ADDFLOW request from a transmitter and an ADDFLOW response from a receiver. The transmitter of a flow will send an ADDFLOW request to the receiver, this being a flow action frame. A given flow will be uniquely identified by the concatenation of a flow ID and a flow address. The flow address will always be either the transmitter's or receiver's MAC address. An ADDFLOW termination 330 is a DELFLOW request usually from the transmitter to delete a flow so as to make room for future flows.

FIG. 4A is an illustration of the contents of the ADDFLOW request in accordance to an embodiment.

The contents of the ADDFLOW request are as follows:

The FID p/n field 405 is one bit (1 b) for flow ID (FID) suggestion present or not (p/n). If not, it is assumed that the responder is not allowed to make a TA-based Flow address.

The FID field 410 is 20 b for flow ID suggestion. If first 4 b are zero, the suggestion is a long flow ID (long/short to be described later) otherwise it is a short flow ID in which case the last 16 b are ignored. This is the suggestion that the requester makes for the flow ID. The responder makes the ultimate decision on flow ID.

The MAC length field 420 is 8 b for length of MAC header of uncompressed frame in this flow. Used to determine where header ends and where the frame body starts. This is needed since the header lengths are different for different frame types, and the number of constant bytes can also vary.

The LHO field 425 is 8 b for length of header offset/value list for header constants.

The HOV field 430 is N*2 octets for header offset/value (HOV) list. Each offset is an offset into the uncompressed header, starting with zero. Each value is the constant value for all frames in this flow.

The LFB field 435 is 8 b for length of frame body (LFB) offset/value list for frame body constants.

The frame body offset (FBO) field 440 is M*2 octets for frame body offset/value list Like above, identifies the constant bytes in the (first 128 bytes of the) frame body. Specifically, this is considering the frame body contents before encryption.

The NCB field 445 is 1 b to indicate if there is a non-constant bit (NCB) in the second byte of the frame control for this flow.

The bit position non-constant frame (PNCB) field 450 is 3 b to indicate the bit position of that non-constant frame control bit. It is expected that there are frequent cases where all but one bit of the frame control would be constant for a given flow, the override bit allows including the non-constant bit without always including the entire byte. This may be expanded to two override bits. A one bit (1 b) field may be added or appended to the PNCB field to indicate that this flow is for frames in which the duration is zero for 3rd party devices. The duration field itself may represent an AID.

The UM field 455 is 1 b to indicate that this flow is for unicast management or data frames that have an ACK following, which ends the frame sequence. (not applicable for fragmented frames unless the flow is specifically for last fragments.) Furthermore, the duration of the ACK must be one of 6 special fixed duration values. The 2-byte duration field can again be replaced with zeros.

The duration field (DF) 460 is 1 b to indicate that the DF is not constant (and represents a duration and not an AID). It is used to indicate a '111' setting in the duration override field. It is likely that whenever the duration field is not included in the list of constants, that the frame control field will be required to be in the list of constants. This constraint will simplify decoding of the flow frame.

This method could be extended to include any constant bit sequences, not just those on byte boundaries. It could be extended to compress any bit sequences that take on only a limited set of values. It could also allow various compression schemes. However, for simplicity of implementation, only constant byte sequences are considered. (Other than the override bit in the frame control field.)

FIG. 4B is an illustration of the contents of the ADDFLOW response in accordance to an embodiment. The receiver of the ADDFLOW request will respond with a flow action frame of type ADDFLOW response.

The contents of this frame includes the following:

The A/D field 470 is 1 b to accept or decline the request.

The FA field is 1 b to indicate if the flow Address is the transmitter's MAC address or the receiver's MAC address.

The FID field is 20 b for flow ID (with first 4 b determining if short or long flow ID). This flow ID is the same as the one in the ADDFLOW request if the TA is chosen, otherwise it is chosen by the receiver of the ADDFLOW request (and therefore the transmitter of this ADDFLOW response).

FIG. 4C is an illustration of the contents of the DELFLOW frame in accordance to an embodiment. This is a flow action frame of type DELFLOW, used to delete a flow, allowing future reuse of the flow ID for new flows. The contents are the following:

The FID field 490 is 20 b flow ID.

The action field 495 is the action to delete the flow.

At this point, only the flow transmitter can send the DELFLOW frame. There can also be mechanisms to automatically delete flows, specifically any STA that deauthenticates with an AP could trigger the deletion of all unicast flows between that STA and the AP.

Figure 5:
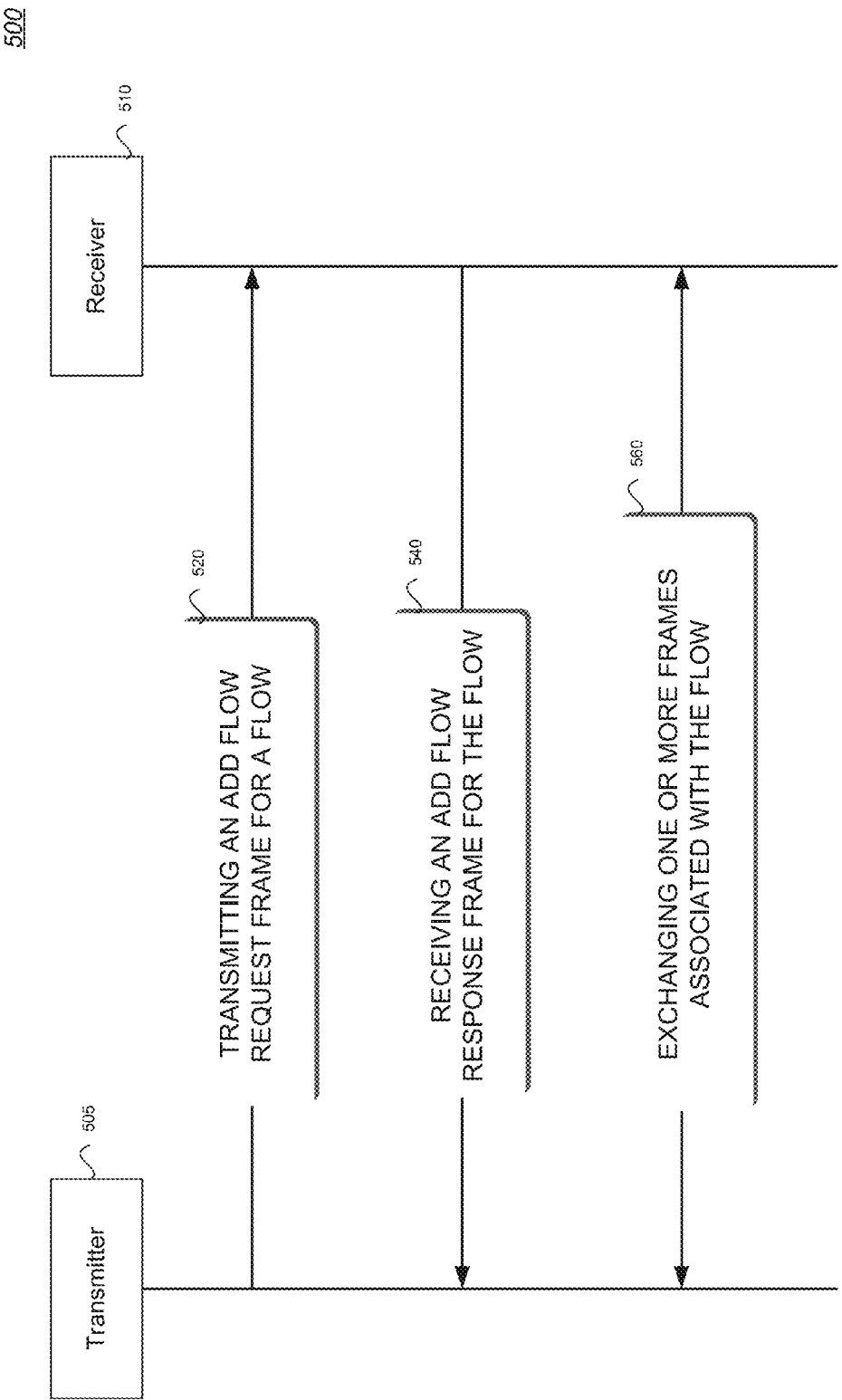
FIG. 5 is a method to process an ADDFLOW request in accordance to an embodiment.

FIG. 5 is a method 500 to process an ADDFLOW request in accordance to an embodiment. Method 500 begins with a transmitter 505 transmitting 520 an ADD Flow request frame for a flow to the receiver of a device. The receiver 510 responds 540 to the transmitter 505 with an ADD Flow response frame for the flow. After the processing of the request and the response the transmitter 505 and the receiver 510 exchange 560 one or more frames associated with the flow. Method 500 can be extended to accommodate the following scenarios:

1) For multicast and broadcast flows, the flow address must be the transmitter address. For multicast (and perhaps some broadcast) flows, the transmitter would need to send ADDFLOW requests to each receiver.

2) For broadcast flows, it is possible for the transmitter to periodically broadcast the ADDFLOW request, so that receiving STAs would know what the full contents of the compressed broadcast flows are.

3) For Beacon flows it would make sense to reserve one flow ID specifically. This requires defining the exact contents in the specification, and skipping the use of these flow action frames entirely for compressed beacons. (Bytes expected to be unchanged for many beacons would be identified and removed from this compressed beacon flow, and periodic full beacons would be required to update these values.)

4) For traffic that might be very common between a STA and an AP (i.e., for flows relating to unicast data, ACK, RTS, and the like) the skipping or the use of flow action frames and predefining of these flows at the time of association would make sense.

5) For flows involving encrypted frames, it was mentioned that any constant bytes in the payload would refer to values after encryption (once the bytes are encrypted they will not be constant for all frames in the flow). However, for security concerns related to identifying those bytes in the ADDFLOW request, it is likely that the ADDFLOW request frame itself should be encrypted in these circumstances. (Or disallow identifying constant payload bytes if the flow is encrypted.)

6) An additional field in the ADDFLOW request could be added to indicate a truncated FCS field and amount of truncation. (For some frames, a shortened FCS might be considered as sufficient protection compared to the full 32-bit FCS. For a compressed ACK, no FCS at all is fine.)

7) In instances where the MAC address has been inserted into the FCS calculation and removed from the header of flow frames then the flow address is the address inserted into the FCS calculation for all frames in the flow. In addition, the short/long flow ID distinction would be removed and the bit width of the entire flow ID would likely be lengthened. Each flow ID would be generated using a pseudo-random or random algorithm to minimize flow ID collisions. For AP/STA flows, it would make sense to require the AP to always generate the flow ID (whether it is the transmitter of the flow or the receiver). The AP could then ensure that all flow IDs within the BSS are unique.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CDROM, CDR, and the like) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, and the like; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

We claim:

1. A method to reduce redundancy for a flow in a wireless network, comprising:
    enabling a receiver having a transceiver operable in the wireless network to send back a response frame for the flow to a transmitter in communication with the receiver by defining a new response type to reply to an ADDFLOW request received from the transmitter, wherein the new response type contains at least one field selected from a group consisting of flow ID and flow address;
    wherein the response frame includes a field to indicate that the ADDFLOW request from the transmitter is to be accepted or declined by the receiver;
    reserving one flow ID specifically for beacon flows;
    wherein the ADDFLOW request comprises a flow ID (FID) suggestion present or not (p/n) field to indicate that the receiver is allowed to choose the flow ID;
    wherein the flow includes a plurality of frames having common bit sequences.

2. The method of claim 1, wherein the flow address is a transmitter's MAC address or a receiver's MAC address.

3. The method of claim 2, further comprising:
    transmitting a DelFlow frame, wherein the DelFlow frame is to delete the flow.

4. The method of claim 3, wherein the flow may be uniquely identified by the concatenation of the flow ID and the flow address.

5. The method of claim 3, wherein for multicast flows the transmitter sends an ADDFLOW request to each receiver.

6. The method of claim 3, further comprising:
    generating a flow ID using a random algorithm generator to minimize flow ID collisions.

7. The method of claim 2, wherein a wireless device in the wireless network is configure to operate in accordance with the Institute of Electrical and Electronics Engineers (IEEE) 802.11ah standard.

8. A system to communicate using flows in a wireless network, comprising:
    a transmitter adapted for communication with a receiver in the wireless network, said receiver including a transceiver adapted to send back a response frame for a flow in said wireless network by enabling said receiver to send back acknowledgements to different transmitters in communication with said receiver by defining a new response type to reply to an ADDFLOW request received for multiple transmitters, wherein the new response type contains at least one field selected from a group consisting of flow ID and flow address;
    wherein the response frame includes a field to indicate that the ADDFLOW request from the transmitter is to be accepted or declined by the receiver;
wherein the ADDFLOW request comprises a flow ID (FID) suggestion present or not (p/n) field to indicate that the receiver is allowed to choose the flow ID;
    wherein one flow ID is specifically reserved for beacon flows;
    wherein the flow includes a plurality of frames having common bit sequences.

9. The system of claim 8, wherein the response frame includes a field to indicate if the flow Address is a MAC address belonging to the transmitter or to the receiver.

10. The system of claim 9, wherein the transmitter further transmits a DelFlow frame, wherein the DelFlow frame to delete the flow.

11. The system of claim 10, wherein the flow may be uniquely identified by the concatenation of the flow ID and the flow address.

12. The system of claim 10, wherein for multicast flows the transmitter sends an ADDFLOW request to each receiver.

13. The system of claim 10, wherein a wireless device in the wireless network is configure to operate in accordance with the Institute of Electrical and Electronics Engineers (IEEE) 802.11ah standard.

14. The system of claim 13, wherein the receiver is an access point (AP) that generates the flow ID with a random algorithm.

15. A non-transitory computer readable medium encoded with computer executable instructions, which when accessed, cause a machine to perform operations comprising:
- enabling a receiver operable in the wireless network to send back a response frame for a flow to a transmitter in communication with the receiver by defining a new response type to reply to an ADDFLOW request received from the transmitter, wherein the new response type contains at least one field selected from a group consisting of flow ID, or flow address;
- reserving one flow ID specifically for beacon flows;
- wherein the response frame includes a field to indicate that the ADDFLOW request from the transmitter is to be accepted or declined by the receiver;
- wherein the ADDFLOW request comprises a flow ID (FID) suggestion present or not (p/n) field to indicate that the receiver is allowed to choose the flow ID;
- wherein the flow includes a plurality of frames having common bit sequences.

16. The non-transitory computer readable medium encoded with computer executable instructions of claim 15, wherein the response frame includes a field to indicate if the flow Address is a MAC address belonging to the transmitter or to the receiver.

17. The non-transitory computer readable medium encoded with computer executable instructions of claim 16, the machine to further perform operations comprising:
- transmitting a DelFlow frame, the DelFlow frame to delete the flow.

18. The non-transitory computer readable medium encoded with computer executable instructions of claim 17, wherein the wireless network is configure to operate in accordance with the Institute of Electrical and Electronics Engineers (IEEE) 802.11ah standard.

19. The non-transitory computer readable medium encoded with computer executable instructions of claim 18, wherein the flow may be uniquely identified by the concatenation of the flow ID and the flow address.

20. The non-transitory computer readable medium encoded with computer executable instructions of claim 18, wherein for multicast flows the transmitter sends an ADDFLOW request to each receiver.

21. The non-transitory computer readable medium encoded with computer executable instructions of claim 18, the machine to further perform operations comprising:
- generating a flow ID using a random algorithm generator to minimize flow ID collisions.

* * * * *